United States Patent
Xie et al.

(10) Patent No.: US 7,224,885 B1
(45) Date of Patent: May 29, 2007

(54) ARRANGEMENT FOR RECORDING NAVIGATION INFORMATION IN A DATA RECORDER

(75) Inventors: Jianlei James Xie, Carmel, IN (US); Mark Alan Schultz, Carmel, IN (US); Michael Dillon Rich, Fishers, IN (US)

(73) Assignee: Thomson Licensing, Boulogne-Billancourt (FR)

(*) Notice: Subject to any disclaimer, the term of this patent is extended or adjusted under 35 U.S.C. 154(b) by 1163 days.

(21) Appl. No.: 10/130,012

(22) PCT Filed: Nov. 3, 2000

(86) PCT No.: PCT/US00/30344

§ 371 (c)(1),
(2), (4) Date: Sep. 17, 2002

(87) PCT Pub. No.: WO01/35649

PCT Pub. Date: May 17, 2001

(51) Int. Cl.
*H04N 5/91* (2006.01)
*H04N 7/26* (2006.01)
(52) U.S. Cl. .......................... 386/68; 386/111
(58) Field of Classification Search ............. 386/68, 386/95, 109, 111

See application file for complete search history.

(56) References Cited

U.S. PATENT DOCUMENTS 5,870,523 A * 2/1999 Kikuchi et al. .............. 386/95

(Continued)

FOREIGN PATENT DOCUMENTS

EP 724 264 7/1996

(Continued)

OTHER PUBLICATIONS

Patent Abstracts of Japan—Pub. No. 08340510A Dec. 24, 1996 Hitachi Ltd. Hachiman Takeshi Recording & Reproducing Device For Digital Video Signal for Disk.

(Continued)

*Primary Examiner*—Jeffrey Stucker
*Assistant Examiner*—Tat Chi Chio
(74) *Attorney, Agent, or Firm*—Joseph J. Laks; Robert B. Levy; Jorge Tony Villabon

(57) ABSTRACT

A data recorder for a digital video disc includes a first-in, first-out buffer memory. The memory is responsive to an input data signal for sequentially storing in a first-in, first-out manner a running, data of Video Object Units (VOBU's), defined in the Digital Versatile Disc (DVD) Specification for Read Only Disc (the specification), prior to recording the data. In a first embodiment of the invention, the values of each address pointer of a first sub-set of address pointers contained in a field VOBU Search Information (VOBU_SRI), are established in accordance with the VOBU's contained in the buffer memory. The value of each address pointer of a second sub-set of the address pointers, associated with VOBU's positioned further behind, in a sequence of presentation, than each of the VOBU's contained in the memory is not made to conform to the Specification. Thereby, a storage capacity requirement from the buffer memory is reduced. In a second embodiment of the invention, the size of each Cell in the data format is constrained to only 59 VOBU's. The entries for each address pointer of the second sub-set, is made to contain a "does not exist" code.

7 Claims, 4 Drawing Sheets

U.S. PATENT DOCUMENTS 6,212,208 B1 * 4/2001 Yoneda et al. .............. 370/538
6,233,389 B1 * 5/2001 Barton et al. ................. 386/46

FOREIGN PATENT DOCUMENTS

EP           795 871         9/1997
EP           817 480         1/1998
EP           0942426        9/1999

OTHER PUBLICATIONS

Patent Abstracts of Japan—Pub. No. 10004536A Jan. 6, 1998 NEC Corp. Suzuki Naoki "Automatic Data Recording & Reproducing Device for Digital Video Disk".

Patent Abstracts of Japan—Pub. No. 11007722A Jan. 12, 1999 Victor Co. of Japan Ltd. Tanaka Yoshiaki et al. DVD Audio Disk, And Recording & Reproducing Method, Encode Device & Decode Device Therefor.

Patent Abstracts of Japan—Pub. No. 62272684A Nov. 26, 1987 Sharp Corp. Takeda Shoji "Recording Method For Digital Video Recording Disk".

Patent Abstracts of Japan—Pub. No. 62268278A Nov. 20, 1987 Sharp Corp. Imai Takahiro "Recording Method For Digital Video Recording Disc".

Patent Abstracts of Japan—Pub. No. 06268954A Sep. 22, 1994 Sony Corp. Nakagawa Tomhiro "Digital Video Disk and Device".

U.S. Appl. No. 378,669, filed Aug. 20, 1999 Shu Lin et al. A Digital Video Processing and Storage System for Video, Audio an Ancillary.

* cited by examiner

| | |
|---|---|
| FWDI (240) | +240 VOBU start address |
| FWDI (120) | +120 VOBU start address |
| FWDI (60) | + 60 VOBU start address |
| FWDI (20) | + 20 VOBU start address |
| FWDI (15) | + 15 VOBU start address |
| FWDI (14) | + 14 VOBU start address |
| FWDI (13) | + 13 VOBU start address |
| FWDI (12) | + 12 VOBU start address |
| FWDI (11) | + 11 VOBU start address |
| FWDI (10) | + 10 VOBU start address |
| FWDI (9) | + 9 VOBU start address |
| FWDI (8) | + 8 VOBU start address |
| FWDI (7) | + 7 VOBU start address |
| FWDI (6) | + 6 VOBU start address |
| FWDI (5) | + 5 VOBU start address |
| FWDI (4) | + 4 VOBU start address |
| FWDI (3) | + 3 VOBU start address |
| FWDI (2) | + 2 VOBU start address |
| FWDI (1) | + 1 VOBU start address |

FIG. 3A

| | |
|---|---|
| BWDI (1) | − 1 VOBU start address |
| BWDI (2) | − 2 VOBU start address |
| BWDI (3) | − 3 VOBU start address |
| BWDI (4) | − 4 VOBU start address |
| BWDI (5) | − 5 VOBU start address |
| BWDI (6) | − 6 VOBU start address |
| BWDI (7) | − 7 VOBU start address |
| BWDI (8) | − 8 VOBU start address |
| BWDI (9) | − 9 VOBU start address |
| BWDI (10) | − 10 VOBU start address |
| BWDI (11) | − 11 VOBU start address |
| BWDI (12) | − 12 VOBU start address |
| BWDI (13) | − 13 VOBU start address |
| BWDI (14) | − 14 VOBU start address |
| BWDI (15) | − 15 VOBU start address |
| BWDI (20) | − 20 VOBU start address |
| BWDI (60) | − 60 VOBU start address |
| BWDI (120) | −120 VOBU start address |
| BWDI (240) | −240 VOBU start address |

FIG. 3B ated with data word FWDI(m). Similar symbols and
ARRANGEMENT FOR RECORDING NAVIGATION INFORMATION IN A DATA RECORDER This application claims the benefit under 35 U.S.C. § 365 of International Application PCT/US00/30344, filed Nov. 3, 2000, which claims the benefit of United States Provisional application, filed Nov. 10, 1999.

BACKGROUND OF THE INVENTION

In a Digital Video Disc (DVD) for read-only disk type application, packetized video data, conforming to the Motion Picture Expert Group #2 (MPEG-2) standard for compression, and/or audio data are multiplexed onto a DVD disc. The data are recorded in a manner compliant with Part 3, VIDEO SPECIFICATIONS of the existing DVD Specifications for Read-Only Disc (the Specification). The read-only DVD data format employs a sub-set of the MPEG-2 format and is defined by a proprietary standard adopted by a consortium of consumer electronics companies and described in available literature such as "DVD Demystified—The Guidebook of DVD-Video and DVD-ROM", 1997, by Jim Taylor published by McGraw Hill. Further, MPEG-2 compatible data is encoded in accordance with the "MPEG standard" comprised of a system encoding section (ISO/IEC 13818-1, 10th Jun. 1994) and a video encoding section (ISO/IEC 13818-2, 20th Jan. 1995).

Multiplexed data are segmented into logical blocks referred to as Video Object Units (VOBU's) forming a presentation sequence. FIG. 1 illustrates schematically a normal forward presentation sequence that includes, for example, VOBU (n−m), VOBU(n) and VOBU (n+m) in that order. The number represented by the symbol "n" provides the position of the VOBU within the sequence. Current VOBU (n) represents, for example, the VOBU that currently provides the video and audio information for playback or for recording, in accordance with the context. Similarly, future VOBU(n+m) provides the video and audio information following current VOBU (n) and is separated from current VOBU (n) by a number of intervening VOBU's determined by the numerical value of the symbol "m". In the same manner, past VOBU (n−m) provides the video and audio information prior to current VOBU (n).

FIG. 2 illustrates schematically the data structure within VOBU (n). Similar symbols and numerals in FIGS. 1 and 2 indicate similar items or functions. The video information of VOBU (n) of FIG. 2 is encoded in accordance with the MPEG-2 standard and recorded in data fields, each occupying a single sector on the disc, for example, a data field or portion Video Pack (V-PCK) 202. Similarly, audio information is recorded in data fields, each occupying a single sector on the disc, for example, a data field or portion Audio Pack (A-PCK) 203.

Additionally, the data structure of VOBU (n) includes a single data field or portion Navigation Pack (Nav_Pack) 201, containing information concerning the presentation control of VOBU (n) and occupying a single sector on the disc. Data field Nav_Pack 201 includes a data field referred to in the specification as Data Search Information (DSI), not shown, that includes a data field VOBU Search Information (VOBU—SRI) 201a having a length of 168 bytes. Field VOBU—SRI 201a contains information selectively used for searching data in either future or past VOBU's relative to current VOBU (n) in order to perform "trick" play operation such as fast reverse or fast forward. In the trick play operation, a sub-set of the pictures VOBU's in the presentation sequence provide content information for achieving a look that is faster than in the normal presentation sequence.

The table of FIG. 3 includes FIGS. 3A and 3B. A given 4-byte address pointer or data word FWDI(m), shown in the table of FIG. 3 and contained in field VOBU—SRI 201a of current VOBU (n) of FIG. 1, identifies a start, logical sector address of a corresponding future VOBU, not shown, associated with data word FWDI(m). Similar symbols and numerals in FIGS. 1, 2 and 3 indicate similar times or functions. In normal forward presentation mode, a future VOBU such as, for example, future VOBU (n+m), associated with data word FWDI(m) is presented for display, following an interval measured from the presentation start time of current VOBU (n) that has a duration, in seconds, equal to 0.5 multiplied by the value of "m". The parameter "m" is selected from the consecutive integer values, 1 through 15 and the integer values 20, 60, 120 and 240. For example, word FWDI(m=20) refers to a future VOBU which is presented in the normal forward presentation sequence 20 VOBU's following current VOBU (n).

Similarly, each 4-byte address pointer or data word BWDI (m) in the table of FIG. 3 identifies the start, logical sector address of a corresponding past VOBU, for example, VOBU (n−m), associated with data word BWDI (m). The past VOBU associated with data word BWDI (m) is presented for display, in normal forward presentation mode, before the presentation start time of current VOBU (n) by an interval having a duration, in seconds, equal to 0.5 multiplied by the value of "m". The parameter "m" can be selected from the same integer values. For example, word BWDI(m=20) refers to a VOBU which appears is in the presentation sequence 20 VOBU's before current VOBU (n).

In a trick mode operation, a DVD player, not shown, conforming to the Specification, may obtain the address of the next VOBU for processing from the corresponding entry, word FWDI(m) or BWDI(m), in field VOBU—SRI 201a of current VOBU (n) of FIG. 2. Thereby, the presentation of the video information contained in intervening VOBU's is omitted or skipped over to provide for fast forward or fast reverse trick mode operations. For example, when, in the fast trick mode the 21$^{th}$ future VOBU is presented immediately after current VOBU (n), the presentation of the 20 VOBU's, interposed between them, are skipped over. When displaying 1-only pictures for 10 fields per 1 picture, the result is a fast trick mode operation that is approximately 60 times faster than in the normal presentation mode.

It may be desirable to perform a real-time recording of audio and video content on discs compatible for playback operation with existing read-only DVD players, intended for discs conforming to the Specification. That means that data words FWDI(m) and BWDI(m) have to be provided in the data stream. Recording data words BWDI(m) in current VOBU (n) does not necessitate the usage of a large buffer memory in the recorder. This is so because the sector addresses of past VOBU's associated with data words BWDI(m) could be computed prior to receiving the data of current VOBU (n).

On the other hand, accumulating appropriate values for recording data word FWDI (m) might, disadvantageously, require a large buffer memory. Because of a variable bit-rate in MPEG encoding, without extensive data buffering, it cannot be known at the time the video data, for example, of current VOBU (n) is produced by the MPEG encoder what addresses the future VOBU will have.

In order to record in field VOBU—SRI 201a, for example, word FWDI(m=240) of FIG. 3, related to the 241$^{th}$ future VOBU, all the video information of the intervening VOBU's has to be encoded, assembled and stored for computing the starting sector address of the $241^{th}$ future VOBU. The $241^{th}$ future VOBU appears 240 VOBU's after current VOBU (n). Therefore, the information associated with each of the intervening 240 future VOBU's might have to be stored in a memory prior to recording on the disc the information of field VOBU—SRI 201a of current VOBU (n). After each of the 241 future VOBU's has been produced, words FWDI(m) of the table of FIG. 3 could be generated. Disadvantageously, storing such a large number of VOBU's requires an excessively large storage space in the memory in the range of 100 Mega-Byte.

In carrying out an inventive feature, the address pointer for each of the $61^{th}$, $121^{th}$ and $241^{th}$ future VOBU's, ahead of current VOBU (n) of FIG. 1, that, according to the Specification, should be contained in words FWDI(m=60), FWDI(m=120) and FWDI(m=240), respectively, instead, is set to a value that need not conform to the Specification. Whereas, the address contained in each of words FWDI (m=1) through FWDI(m=20) is made to conform to the Specification. Consequently, the maximum fast forward trick mode, that corresponds to word FWDI(m=20), is 60 times faster than in the normal presentation mode, as indicated before. Advantageously, such an arrangement reduces the memory requirement significantly, to the order of 8 Mega-Byte.

In carrying out a further inventive feature, in each of words FWDI(m=60), FWDI(m=120) and FWDI(m=240), respectively, the value of, for example, word FWDI(m=20) associated with the $20^{th}$ future VOBU is, instead, recorded. Thereby, a DVD player having the capability of operating in a fast forward trick mode, faster than 60 times the normal presentation mode, will be limited to the 60 times faster trick mode.

The logical sector addresses provided in field VOBU—SRI 201a are valid, in accordance with the Specification, for a predetermined group of VOBU's referred to as a "Cell" such as Cell 206 of FIG. 1. Cell 206, for example, is a logical association of VOBU's that includes, for example, VOBU (n–m), VOBU (n) and VOBU (n+m), and the intervening VOBU's. Cell 206 is delineated by two sector addresses containing a start logical sector number and an end logical sector number, respectively. In the Specification, Section 4.5.4, subsections 2 and 4, it is stated that if a given word FWDI (or BWDI) were to point to an address of a VOBU outside the range of a Cell, such as Cell 206, then, instead, it should contain a bit combination referred to as "does not exist" code, rather than an address pointer of an actual VOBU.

In accordance with another inventive feature, each Cells is constrained in size to only 59 VOBU's. As a result of constraining each Cell in size to only 59 VOBU's, the entries for each of words FWDI(m=60), FWDI(m=120) and FWDI (m=240) need only contain the aforementioned "does not exist" code. Therefore, advantageously, the need for a large buffer memory is diminished.

SUMMARY OF THE INVENTION

A data recorder apparatus, embodying an aspect of the invention, is used for recording in a recording medium navigation data, facilitating a trick, playback mode of operation, and information data contained in each data unit of a sequence of data units forming an input data signal. The data recorder apparatus includes a buffer memory responsive to the input data signal for storing the information data of a running plurality of the data units and for reading out the stored information data of the running plurality of data units, sequentially. The information data of a data unit next-in-line to be recorded are developed at an output of said buffer memory. A value conforming to a position of a first address pointer of a plurality of address pointers of the navigation data of the next-in-line data unit is produced when the information data of a data unit associated with the first address pointer position and referred to by the first address pointer value are present concurrently with the information data of the next-in-line data unit in the buffer memory. The conforming value identifies where in the recording medium the data information of the associated data unit are designated to be recorded. The production of a value conforming to a position of a second address pointer of the plurality of address pointers is avoided, when the data unit associated with the second address pointer and the next-in-line data unit are included in different cells. A number of data units that are included in the common cell are limited to a limit value determined in accordance with a maximum number of data unites having information data that can be contained concurrently in the buffer memory. The information data and the navigation data of the next-in-line data unit are recorded in the recording medium.

A data recorder apparatus, embodying another aspect of the invention, is used for recording in a recording medium navigation data, facilitating a trick, playback mode of operation, and information data contained in each data unit of a sequence of data units partitioned into cells and forming an input data signal. The data recorder apparatus includes a buffer memory responsive to the input data signal for storing the information data of a running plurality of the data units and for reading out the stored information data of the running plurality of data units, sequentially. The information data of a data unit next-in-line to be recorded are developed at an output of the buffer memory. A value conforming to a position of a first address pointer of a plurality of address pointers of the navigation data of the next-in-line data unit is produced when a data unit associated with the first address pointer position is included with the next-in-line data unit in a common cell. The conforming value identifies where in the recording medium the data information of the associated data unit are to be recorded. The production of a value conforming to a position of a second address pointer of the plurality of address pointers is avoided when a data unit associated the second address pointer and the next-in-line data unit are included in different cells. A number of data units that are included in the common cell are limited to a limit value determined in accordance with a maximum number of data units having information data that can be contained concurrently in the buffer memory. The information data and the navigation data of the next-in-line data unit are recorded in the recording medium.

BRIEF DESCRIPTION OF THE DRAWINGS

In the drawing:

FIG. 3, formed by FIGS. 3A and 3B, shows in a table form the data structure within a portion of a Navigation Pack of the Video Object Unit of FIG. 2, in accordance with the prior art Specification.

DETAILED DESCRIPTION

Figure 4:
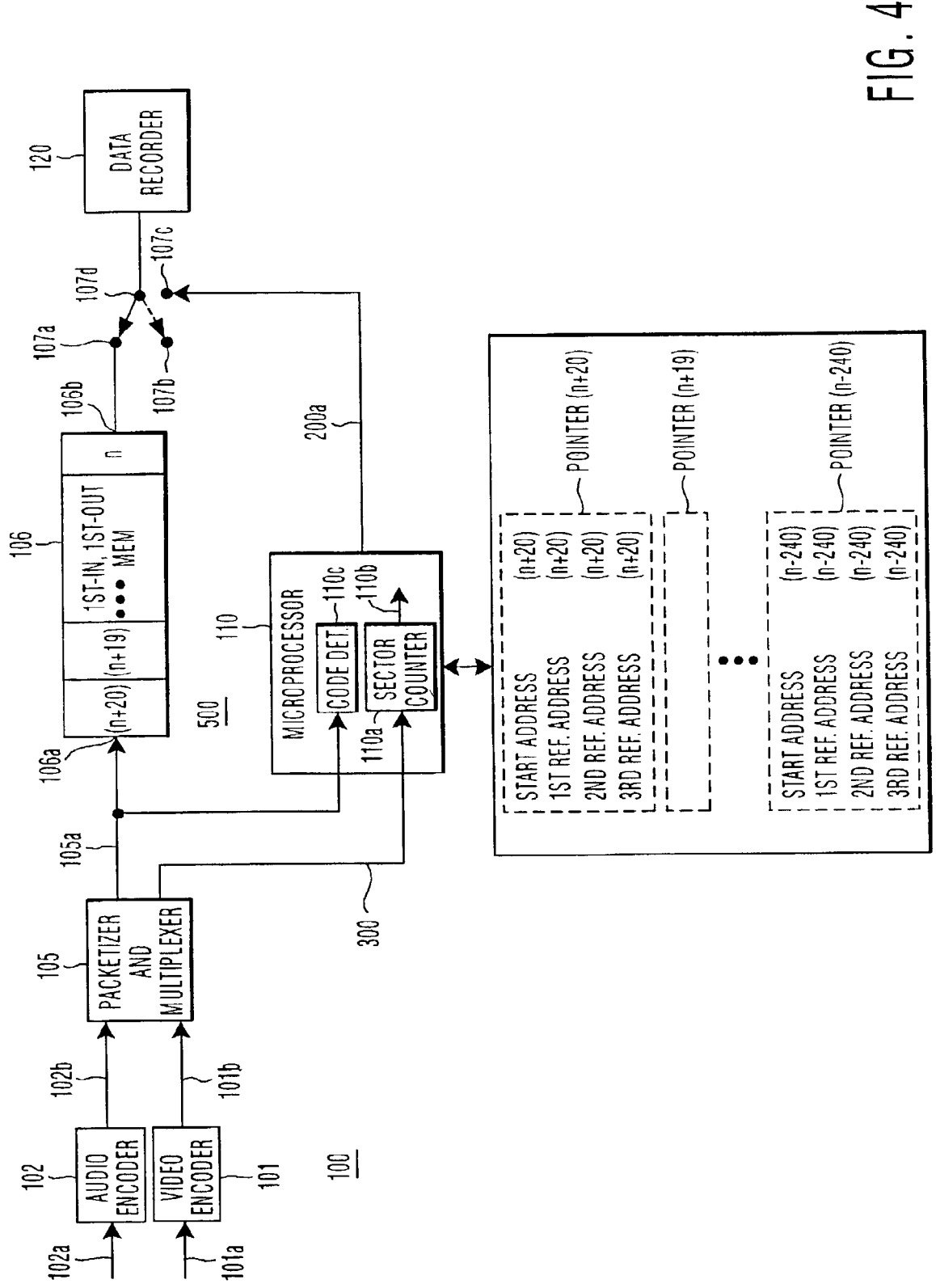
FIG. 4 illustrates in a block diagram a data processing arrangement, in accordance with an aspect of the invention, for a data recorder.

FIG. 4 illustrates in a block diagram a data processing arrangement 500, in accordance with an aspect of the invention, for a data recorder 120. An MPEG encoder 100 includes a video data encoder 101. A data input signal 101a, obtained from, for example, a National Television Standard Committee an (NTSC) decoder, not shown, is coupled to video data encoder 101 for encoding video information in accordance with the MPEG-2 standard in a conventional manner to produce a video data signal 101b. A conventional audio AC-3 (Audio compression version 3) encoder 102, responsive to a stereo audio input signal 102a, is used for generating an AC-3 data signal 102b containing audio information. Signals 102b, and 101b are multiplexed and packetized in a packetizer/multiplexer 105 to form a multiplexed data signal 105a.

Figure 2:
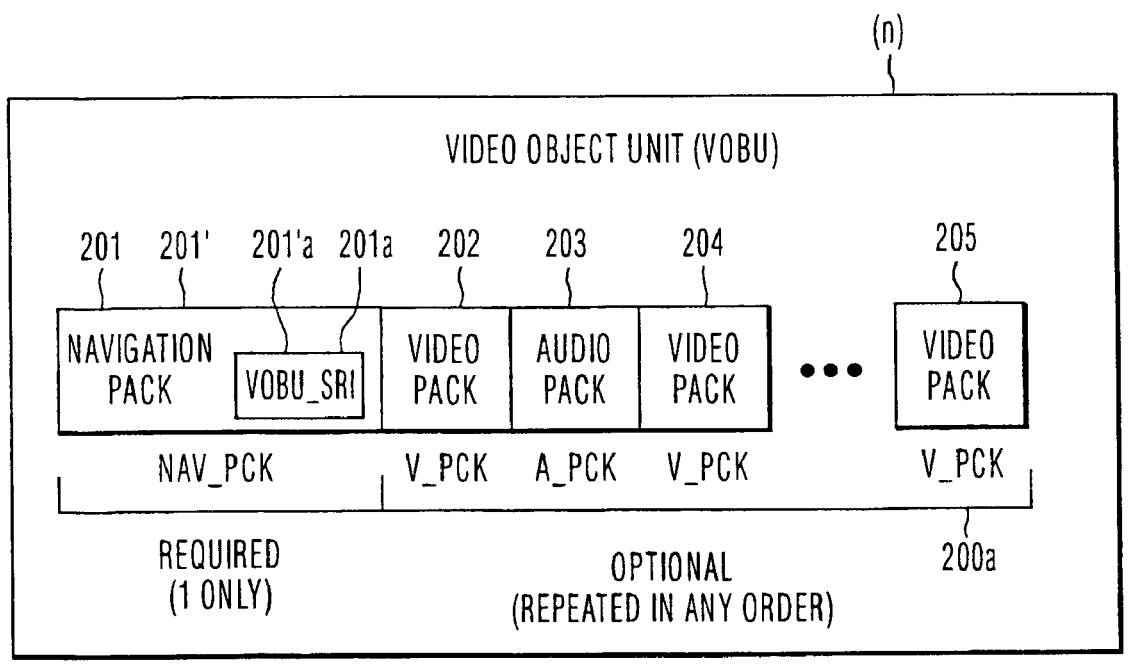
FIG. 2 illustrates schematically structure of data a Video Object Unit (VOBU) of the Cell of FIG. 1, in accordance with the prior art Specification.

The data of data signal 105a are logically partitioned to sequentially produced Cells, in accordance with the Specification, such as, for example, Cell 206 of FIG. 2. Each Cell contains VOBU's having a data structure substantially the same as of VOBU (n), except for differences noted below. In signal 105a, the bit count or data space of, for example, a data field Nav_Pack 201' of VOBU (n), that is analogous to data field Nav_Pack 201, is the same as in data field Nav_Pack 201. However, a portion of data field Nav_Pack 201' in signal 105a contains "dummy" data that are subsequently modified, as described later on.

Data signal 105a is also coupled to a first-in, first-out buffer memory 106 for storing the data of each most recently appearing VOBU, VOBU (n+20), contained in signal 105a. When the immediately following VOBU appears in signal 105a, it is referred to as VOBU (n+20) and the previously appearing VOBU (n+20) is re-designated VOBU (n+19), and so on.

Memory 106 has a capacity to contain the running data of the most recently produced VOBU's, VOBU (n+20) through VOBU (n). Thus, the data of VOBU (n+20) are the last to be stored in memory 106. The data of VOBU (n) appear in an output signal 106a of memory 106.

The portion of signal 106a that does not contain "dummy" data but the real data to be recorded is coupled to a data recorder 120 for recording in a disc, not shown, of data recorder 120 via a first input terminal 107a. Input terminal 107a is coupled to an output terminal 107d of a switch 107. The coupling between terminals 107a and 107d is controlled by microprocessor 110 via a control terminal 107c. After being recorded, the data of VOBU (n) is eliminated from memory 106 in a first-in, first-out manner.

Encoder 100 generates a flag signal 300 each time the data of a new sector appears in signal 105a. Signal 300 is coupled to microprocessor 110 for incrementing a sector counter 110a each time signal is generated. Each sector data of signal 105a includes a header portion, not shown, identifying the type of sector data such as, for example, identifying the data as being of the same type as portion V-PCK 202, A-PCK 203 or Nav_Pack 201.

When the header portion, not shown, of data field Nav_Pack 201', is detected in a code detector 100c, indicating that the data for a new VOBU (n+20) are about to follow, microprocessor 110 stores, in a first-in, first-out navigation information memory 200, a word START-ADDRESS (n+20). Word START-ADDRESS(n+20) contains the present value of an output signal 110b of sector counter 110a. Thus, word START-ADDRESS (n+20) contains the beginning sector address of VOBU (n+20).

Immediately following the detection in signal 105a of the header portion, microprocessor 110 begins searching in the data stream of signal 105a for the occurrence of a 32-bit Picture-Start-Code, not shown, defined in the Specification. After detecting the Picture-Start-Code in signal 105a, indicating the beginning sector of a first reference, I-type picture frame, not shown, in accordance with MPEG, microprocessor 110 continues searching for the occurrence of an immediately following Picture-Start-Code in the data stream of signal 105a. When the immediately following Picture-Start-Code is detected, microprocessor 110 stores in navigation information memory 200 a word FIRST-REFERENCE-ADDRESS (n+20) containing the then present value of sector counter 110a. Word FIRST-REFERENCE-ADDRESS (n+20) contains the last sector number or address of the first reference, I-type picture frame, defined in the Specification, in VOBU (n+20). The last sector number is also the first sector number of the next picture frame.

In a similar manner, microprocessor 110 stores in navigation information memory 200 a word SECOND-REFERENCE-ADDRESS (n+20), containing a sector number or address of the last sector of a second reference, I or P-type picture frame, not shown, in VOBU (n+20). Similarly, a word THIRD_REFERENCE_ADDRESS (n+20) is stored, containing a sector number of the last sector of a third reference, I or P-type picture frame, in VOBU (n+20).

The group of stored words START-ADDRESS(n+20), FIRST-REFERENCE-ADDRESS(n+20), SECOND-REFERENCE-ADDRESS(n+20) and THIRD-REFERENCE-ADDRESS(n+20), referred to herein, collectively, as a word group POINTER (n+20), is associated with VOBU (n+20). When the immediately following VOBU appears in signal 105a, its corresponding information will be stored in memory 200 that will be referred to as word group POINTER (n+20). Whereas, the previously stored word group POINTER (n+20) will be redesignated as word group POINTER (n+19), and so on. Thereby, memory 200 contains the running data of 261 most recently produced word groups, POINTER (n+20) through word group POINTER (n−240), associated with VOBU (n+20) through VOBU (n−240), respectively. The data of word group POINTER (n+20) are the most recently stored in memory 200. Whereas, the data of word group POINTER (n−240) are the earliest stored and the next to be eliminated from memory 200.

As indicated before, the bit count or data space in output signal 106a of memory 106 that corresponds to VOBU (n) is the same as in the recorded data on the disc, not shown. However, the bits of field VOBU_SRI 201a', for example, of FIG. 2 of VOBU (n) contain "dummy" data in signal 106a.

In carrying out an inventive feature, the aforementioned "dummy" data of field VOBU_SRI 201a' of FIG. 2 of VOBU (n) of signal 106a are substituted prior to the recording. The information contained in word START-ADDRESS (n+20) of word group POINTER (n+20) is used for generating word FWDI(m=20) of VOBU(n) of FIG. 3, to provide an address pointer to the 21$^{th}$ future VOBU. The 21$^{th}$ future VOBU, VOBU (n+20), is located 20 VOBU's behind current VOBU (n) in the presentation sequence. Similarly, the information contained in each of words START-ADDRESS (n+20) through START-ADDRESS (n+1), START-ADDRESS (n−1) through START-ADDRESS (n−15), START-ADDRESS (n−20), START-ADDRESS (n–60), START-ADDRESS (n–120) and START-ADDRESS (n–240) is used for generating words FWDI(m=20) FWDI(m–15) through FWDI (m=1), BWDI (m=1) through BWDI (m=15), BWDI (m=20), BWDI (m=60), BWDI (m=120) and BWDI (m=240), respectively. Accordingly, words FWDI (m=20). FWDI (m=15) through FWDI (m=+1), BWDI (m=1) through BWDI (m=15), BWDI (m=20), BWDI (m=60), BWDI (m=120) and BWDI (m=240) are produced in an output signal 200a of memory 200.

The bits of a data field VOBU_1STREF-EA, a data field VOBU_2NDREF-EA, and a data field VOBU_3RDTREF-EA, not shown, of Nav-Pack 201, are required, in accordance with the Specification, to contain the last sector address of first reference, I-type picture frame, second reference, I or P-type picture frame and third reference, I or P-type picture frame, respectively. Those three data fields similarly contain "dummy" data in NAV_PAK 201'. Accordingly, words FIRST-REFERENCE-ADDRESS (n), SECOND-REFERENCE-ADDRESS (n) and THIRD-REFERENCE-ADDRESS (n) of word group POINTER (n) are used for producing, in signal 200a, the correct data bits of data field VOBU_1 STREF-EA, of data field VOBU_2NDREF-EA and of data field VOBU_3RDTREF-EA, respectively, not shown, of VOBU(n), in substitution of the aforementioned "dummy" data bits.

Signal 200a is coupled to data recorder 120 and recorded in data recorder 120 via a signal path formed by switch 107, when a second input terminal 107b of switch 107 is coupled to output terminal 107d. The coupling between terminals 107b and 107d is controlled by microprocessor 110 via control terminal 107c and occurs at the proper timings for substituting the corresponding "dummy" data bits of field VOBU_SRI 201a' of FIG. 2 of VOBU (n) with the correct data bits obtained from signal 200a.

Figure 1:
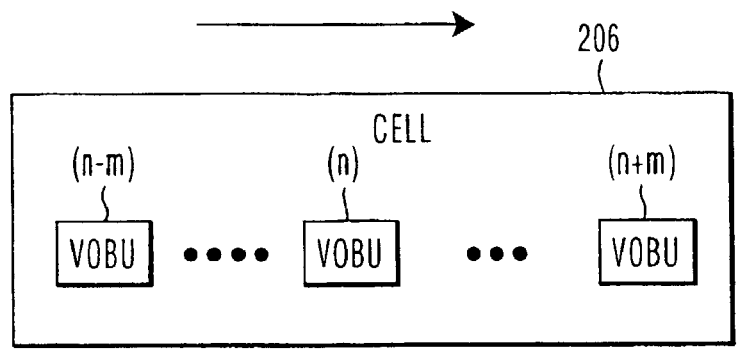
FIG. 1 illustrates schematically data structure of a Cell, in accordance with the prior art Specification.

In carrying out an inventive feature, the pointer for each of the $60^{th}$, $120^{th}$ and $240^{th}$ future VOBU's, ahead of current VOBU (n) of FIG. 1, that would contain words FWDI (m=60), FWDI (m=120) and FWDI (m=240), respectively, in accordance with the Specification, does not conform to the Specification. Whereas, the corresponding address pointers contained in words FWDI(m=1)-FWDI(m=20) are made to conform to the Specification. Consequently, the maximum fast forward trick mode occurs when word FWDI(m=20) is selected for controlling the trick mode. Advantageously, such arrangement reduces the memory size requirement of memory 106 significantly, to the order of 8 Mega-Byte.

In carrying out another inventive feature, in each of words FWDI(m=60), FWDI(m=120) and FWDI(m=240), the pointer of, for example, the 20th future VOBU, contained in word FWDI(m=20), is recorded. Thereby, any DVD player having the capability of operating in a fast forward trick mode, faster than that determined by word FWDI (m=20) will be limited to that determined by word FWDI (m=20).

Packetizer/multiplexer 105 assigns each VOBU to a corresponding Cell such as Cell 206 of FIG. 1 by establishing the proper values of corresponding data fields, not shown, in, for example, Nav_Pack 201' of VOBU (n). The Specification, Section 4.5.4, subsection(s) 2 and 4, states that if a given word FWDI (or BWDI) were to point to an address of a VOBU outside the range of a Cell, then such word FWDI (or BWDI) should contain a bit combination referred to as "does not exist" code, rather than an address of an actual VOBU address.

In accordance with a further inventive feature, the size of each Cell is constrained by packetizer/multiplexer 105 to, for example, only 59 VOBU's. Therefore, the entries for each of words FWDI(m=60), FWDI(m=120) and FWDI (m=240) need only contain the aforementioned "does not exist" code to conform to the Specification. Consequently, Nav_Pack 201, for example, is made to conform to the Specification. The ability to limit the Cell size, such as of Cell 206, to only 59 VOBU's is, advantageously, used to diminish the need for a large buffer memory without any deviation from the Specification.

The maximum number of Cells which can be included in a contiguous fashion so as to be presented seamlessly is 255. The presentation time of a VOBU is between 0.4 and 1.2 seconds and nominally 0.5 seconds. The number of VOBU's that would form a Cell is 59. Thus, a nominal recording of recording content of 127.5 minutes is guaranteed to be seamless.

The invention claimed is:

1. A data recorder apparatus for recording in a recording medium navigation data, facilitating a trick, playback mode of operation, and information data contained in each data unit of a sequence of data units forming an input data signal, comprising:
    a buffer memory responsive to said input data signal for storing the information data of a running plurality of said data units and for reading out the stored information data of said running plurality of data units, sequentially, such that the information data of a data unit next-in-line to be recorded are developed at an output of said buffer memory;
    means responsive to said input data signal for producing a value conforming to a position of a first address pointer of a plurality of address pointers of the navigation data of said next-in-line data unit, when the information data of a data unit associated with said first address pointer position and referred to by said first address pointer value are present concurrently with the information data of said next-in-line data unit in said buffer memory, said conforming value identifying where in said recording medium the data information of said associated data unit are designated to be recorded, the production of a value conforming to a position of a second address pointer of said plurality of address pointers of said next-in-line data unit being avoided, when the data information of a data unit associated with said second address pointer position are not present concurrently with the information data of said next-in-line data unit in said buffer memory; and
    means for recording the information data and said navigation data of said given next-in-line data unit in said recording medium.

2. A data recorder apparatus according to claim 1, wherein the data units recorded in said recording medium are compatible with a player conforming to Digital Versatile Disc (DVD) Specification for Read Only Disc.

3. A data recorder apparatus according to claim 1, wherein said data unit forms a Video Object Unit (VOBU) and said plurality of address pointers are included in a field VOBU Search Information (VOBU-SRI) defined in the Digital Versatile Disc (DVD) Specification for Read Only Disc.

4. A data recorder apparatus according to claim 1, further comprising means for producing the value of said second address pointer equal to said conforming value of said first address pointer.

5. A data recorder apparatus according to claim 4, wherein said value of said second address pointer is made equal to a conforming value of an address pointer selected from said plurality of address pointers that identifies an associated data unit separated from said next-in-line data unit by a largest number of intervening data units.

6. A data recorder apparatus according to claim 1 wherein said buffer memory comprises a first-in, first-out memory.

7. A data recorder apparatus for recording in a recording medium navigation data, facilitating a trick, playback mode of operation, and information data contained in each data unit of a sequence of data units partitioned into cells and forming an input data signal, comprising:

a buffer memory responsive to said input data signal for storing the information data of a running plurality of said data units and for reading out the stored information data of said running plurality of data units, sequentially, such that the information data of a data unit next-in-line to be recorded are developed at an output of said buffer memory;

means responsive to said input data signal for producing a value conforming to a position of a first address pointer of a plurality of address pointers of the navigation data of said next-in-line data unit, when a data unit associated with said first address pointer position is included with said next-in-line data unit in a common cell, said conforming value identifying where in said recording medium the data information of said associated data unit are to be recorded, the production of a value conforming to a position of a second address pointer of said plurality of address pointers being avoided, when a data unit associated with said second address pointer and said next-in-line data unit are included in different cells;

means for limiting a number of data units that are included in said common cell to a limit value determined by a maximum number of data units having information data that can be contained concurrently in said buffer memory; and means for recording the information data and said navigation data of said next-in-line data unit in said recording medium.

* * * * *